United States Patent [19]
Chartrand

[11] Patent Number: 5,978,973
[45] Date of Patent: Nov. 9, 1999

[54] FASTENER FOR USE ON A PROTECTIVE HELMET

[75] Inventor: Daniel Chartrand, Deux-Montagnes, Canada, J7R 3W9

[73] Assignee: Bauer, Inc., Quebec, Canada

[21] Appl. No.: 08/989,651

[22] Filed: Dec. 12, 1997

[51] Int. Cl.⁶ .................................................... A42B 3/18
[52] U.S. Cl. .................................................... 2/422; 2/424
[58] Field of Search ................................ 2/422, 424, 6.2, 2/6.3, 6.7

[56] References Cited

U.S. PATENT DOCUMENTS

| | | | |
|---|---|---|---|
| 4,060,855 | 12/1977 | Rappleyea | 2/413 |
| 4,692,947 | 9/1987 | Black et al. | 2/421 |
| 4,759,670 | 7/1988 | Linder et al. | 411/43 |
| 5,095,552 | 3/1992 | Parkinson | 2/424 |

FOREIGN PATENT DOCUMENTS

| | | |
|---|---|---|
| 1116801 | 1/1982 | Canada . |
| 3232762 A1 | 4/1983 | Germany . |
| 3217065A | 11/1983 | Germany . |
| 2 169 372 | 7/1986 | United Kingdom . |

*Primary Examiner*—Diana Oleksa
*Attorney, Agent, or Firm*—Finnegan, Henderson, Farabow, Garrett & Dunner, L.L.P

[57] ABSTRACT

A protective helmet comprising an outer helmet shell of rigid material and having a fastener mounted into the outer helmet shell. The fastener comprises a rivet and a washer. More particularly, the rivet includes a flanged head portion at a first end of the rivet, a post part at a second end of the rivet, and a section having an obround cross-sectional shape intermediate the flanged head portion and the post part. The post part can be flattened against the washer to form a compound flanged structure abutting against the helmet shell. The fastener further comprises an elongated aperture extending longitudinally from the post part to the flanged head portion. The aperture is threaded to accept a screw-type securing means that can be used to retain accessories such as a face shield onto the protective helmet. The obround section of the fastener locks with the helmet shell so as to prevent the fastener from turning when the screw-type securing means is engaged therein.

8 Claims, 4 Drawing Sheets

FASTENER FOR USE ON A PROTECTIVE HELMET

FIELD OF THE INVENTION

The present invention relates to a protective helmet suitable for use by an occupant or operator of a sports car, or motorized vehicle of the like or for use in sporting activities such as football, hockey and the like, and more particularly to a fastener which can be incorporated into the protective helmet shell to attach accessories such as a face shield to the protective helmet. The fastener is mounted to the protective helmet and can receive a screw-type securing means for retaining the accessory to the helmet shell. The fastener is designed to lock within the helmet shell, so as not to turn when the screw-type securing means is engaged therein.

BACKGROUND OF THE INVENTION

The use of protective helmets in various types of sports or hazardous activities is well known. Protective helmets generally include a number of different accessories such as earpieces, or visor shields or the like, many of which are fastened onto the protective helmet. Common fastening means include screws which threadedly engage nuts. Both the screw and the nut have flanged end portions that abut, respectively, the accessory and the inner surface of the helmet shell.

One of the problems associated with the use of such fastening means arises when tightening or loosening the latter to adjust the accessory. Two hand tools are required to engage each of the screw and nut, respectively, so as to prevent the nut from rotating when the screw is being turned. This is not practical because two hand tools are not always available.

Another disadvantage that relates to helmets which incorporate such fastening means resides in the large number of fastener pieces that must be collected and stored upon removal of an accessory from the protective helmet. The accessory may require a plurality of screws and locking nuts that if lost may result in a situation where the user can no longer attach the accessory.

Thus, there is a need in the industry to provide a protective helmet that comprises an improved fastener mounted to the helmet and capable of receiving a screw-type securing means for retaining accessories to the protective helmet.

OBJECTIVES AND STATEMENT OF THE INVENTION

It is an object of the invention to provide an improved protective helmet which comprises an helmet shell capable of receiving one or more accessories.

It is another object of this invention to provide a fastener for use in a protective helmet to releasably engage a screw-type securing means which may be used to attach accessories to the helmet shell.

It is another object of this invention to provide a protective helmet with a fastener that locks in the helmet shell against rotation, so as not to turn when a screw-type securing means is engaged therein.

As embodied and broadly described herein, the invention provides a protective helmet capable of receiving an accessory, said protective helmet comprising:

a helmet shell shaped to protect the top, rear, front and sides of a wearer's head, said helmet shell comprising at least one mounting aperture; and at least one fastener received into said mounting aperture, said fastener including a flanged head portion and an elongated body, said elongated body having at least on a portion of its length a locking section which is capable of establishing a locking engagement with said helmet shell when received in said mounting aperture to prevent said fastener from turning in said mounting aperture, said fastener being capable of receiving securement means for retaining an accessory to the helmet shell.

In a most preferred embodiment, the fastener includes an elongated body that is comprised of two parts, namely a post part and a locking section having an obround cross-sectional shape. The cross sectional shape of the post can be one of a wide variety of shapes including square, octagonal, however, preferably, it is circular. The locking section of the fastener can also take on a variety of non-circular cross sectional shapes, however preferably, it comprises two opposite parallel sides Joined by rounded surfaces.

Preferably, the fastener includes a flanged head which extends outside of the helmet shell and a washer mounted on the inside of the helmet shell and against which the post is flattened so as to secure the fastener to the helmet. Moreover, the fastener preferably includes a threaded aperture to receive a screw-type securing means for retaining the accessory which can be a face guard or any other suitable attachment. It should be noted that the screw-type securing means can include any sort of fastener that engage by rotary movement, such as screws or bayonet type connectors.

The obround configuration of the locking part prevents the fastener from rotation when a screw is being tightened therein, thus obviating the need for a hand tool to prevent the fastener from turning.

DESCRIPTION OF A PREFERRED EMBODIMENT

Figure 1:
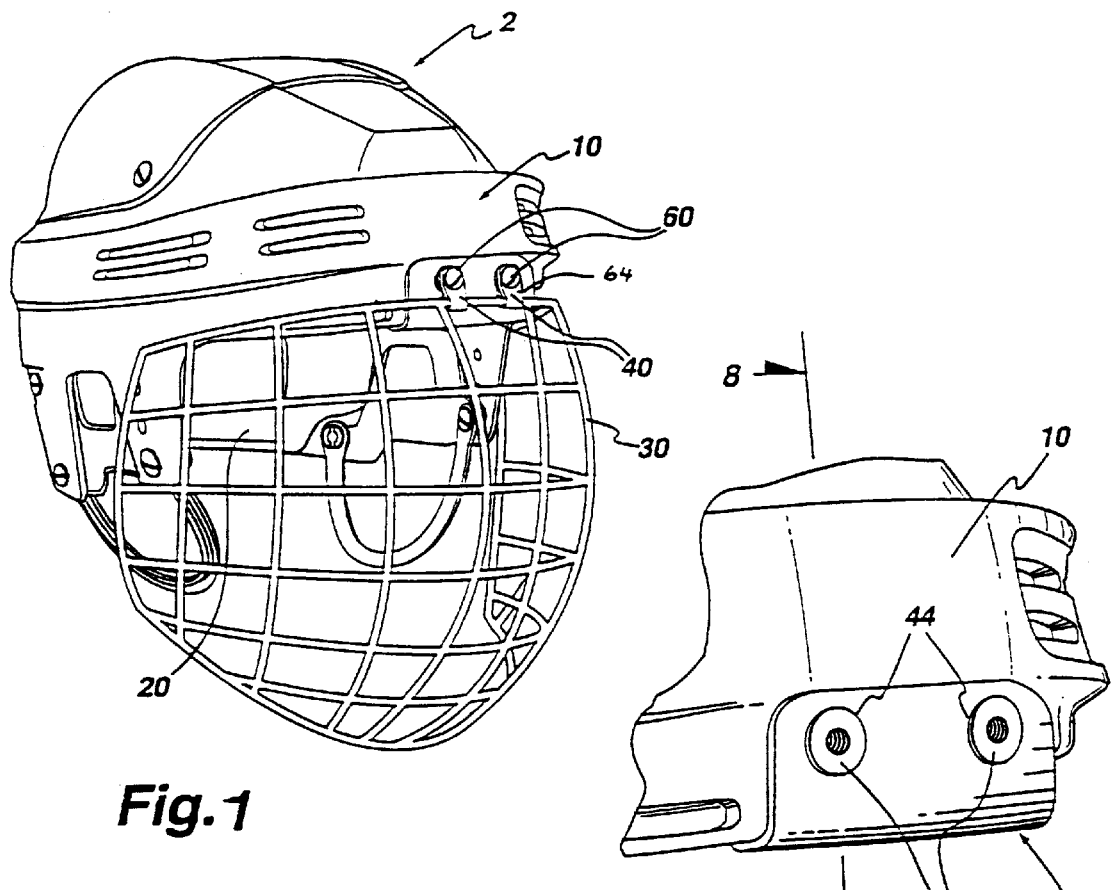
FIG. 1 is a perspective view of the protective helmet in accordance with the present invention.

Referring now to the drawings, FIG. 1 illustrates a protective helmet 2 comprising an outer helmet shell 10 which is preferably made of a rigid material such as a polycarbonate alloy, a rigid thermoplastic, or a thermosetting resin. A pad assembly (not shown in the drawings) is positioned within the helmet shell 10 to absorb forces applied against the helmet shell 10, and prevent them from injuring the wearer's head. The protective helmet 2 further comprises brackets 64 supporting a face guard 30, that attach to the helmet by screws 60 engaged in the novel fasteners 40 anchored to the helmet shell 10.

Figure 2:
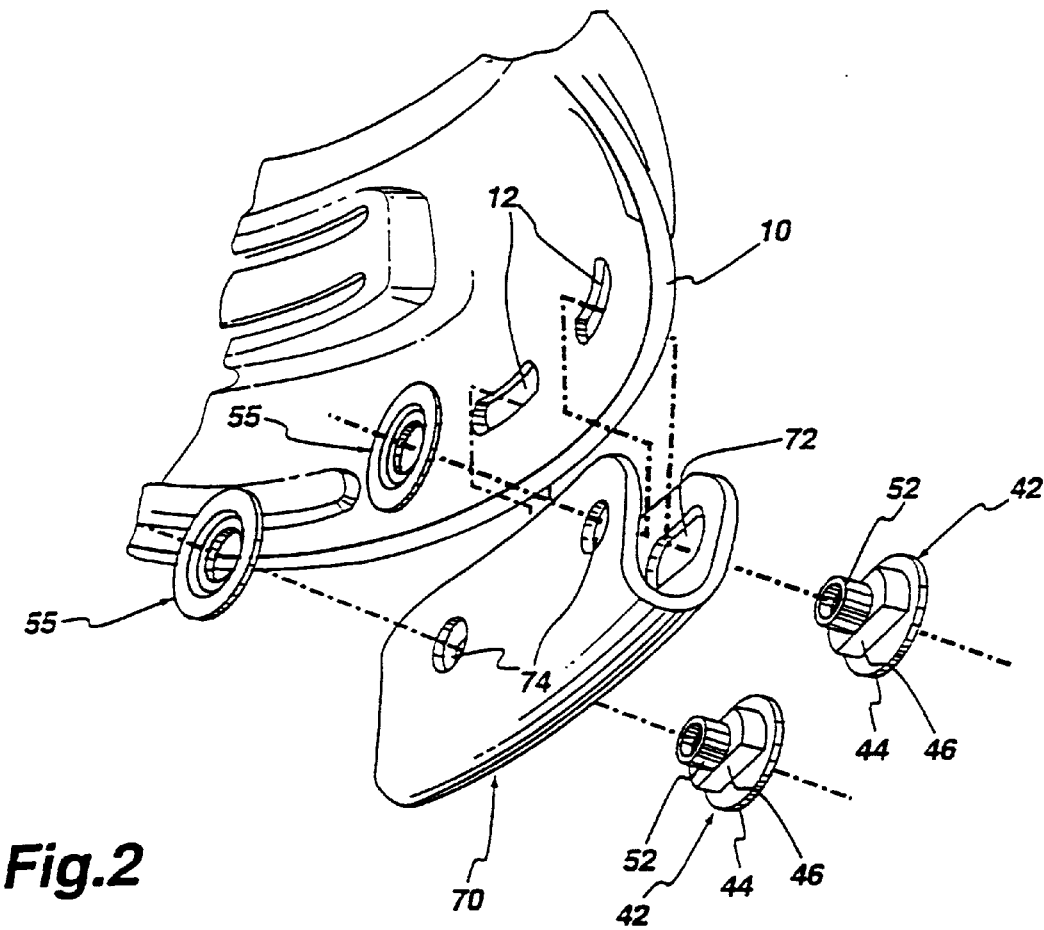
FIG. 2 is a partial exploded perspective view of the protective helmet illustrating the fastener removed from the helmet shell.

As shown in FIG. 2, each fastener 40 comprises a rivet 42 and a washer 55. Most preferably, the rivet 42 is made of C1018 nickel coated steel while the washer 55 is made of S.A.E. 1010 steel.

Figure 3:
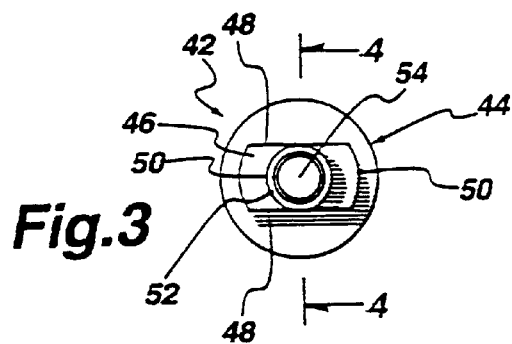
FIG. 3 is a top plan view of the rivet part of the fastener in accordance with the present invention.
Figure 4:
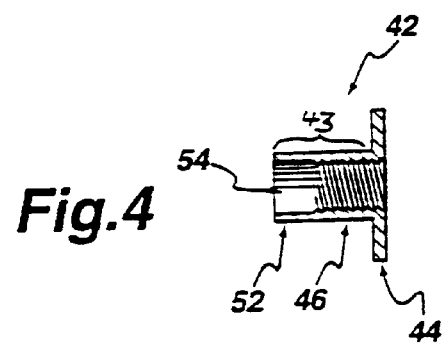
FIG. 4 is a cross sectional view taken along line 4—4 in FIG. 3.

As best illustrated in FIGS. 3 and 4, the rivet 42 includes a flanged head portion 44 defining a first end of the rivet which rests against the outer surface of the helmet shell 10, and an elongated body 43 including a post part 52 defining a second opposite end of the rivet 42 and a locking section 46 which has an obround cross-sectional shape intermediate the flanged head portion 44 and the post part 52. The rivet 42 further comprises an elongated aperture 54 that extends longitudinally from the post part 52 to the flanged head portion 44. The aperture 54 is partially threaded, more specifically the threads extend along the flanged head portion 44 and the intermediate locking section 46. The aperture 54 is adapted to accept a screw 60.

The flanged head portion 44 of the rivet 42 is circular in cross sectional shape. The flanged head portion 44 extends radially outward beyond the outer boundary of the intermediate locking section 46 and post part 52 on the rivet 42. It is important that the flanged head portion 44 has an outer diameter that is significantly larger than the outer boundary of the elongated body 43 to prevent it from passing through the apertures in the helmet shell provided to accept the rivet 42.

The intermediate locking section 46 of the rivet 42 is located between flanged head portion 44 and post part 52. It can be manufactured under a wide assortment of shapes that will establish a locking engagement with mounting apertures 12 of helmet shell 10, to prevent the latter from turning therein. The intermediate locking section 46 has an obround cross-sectional shape which, as the name implies, is non-circular. Accordingly, the intermediate locking section 46 prevents rotation of the fastener 40 within mounting apertures 12 and thereby enables the fastener 40 to receive a screw 60 without having to manually hold the fastener 40 with a hand tool such as a screw driver. The length of the intermediate locking section 46 is essentially equivalent to that of the depth of the mounting apertures 12, which is equivalent to the thickness of the helmet shell 10. Most preferably, the intermediate obround locking section 46 is defined by two opposite parallel surfaces 48 joined by two rounded portions 50.

The post part 52 is preferably circular in cross section and has an outer diameter that is equivalent to the distance between parallel surfaces 48. The thickness of the cylindrical wall is relatively small so as to be malleable to form a secondary head 80 by flattening a portion of the post part 52 to spread it radially outwardly and overlap the washer 55 and thus form a compound flanged structure that secures the fastener 40 to the helmet shell 10 in cooperation with flanged head portion 44.

Figure 5:
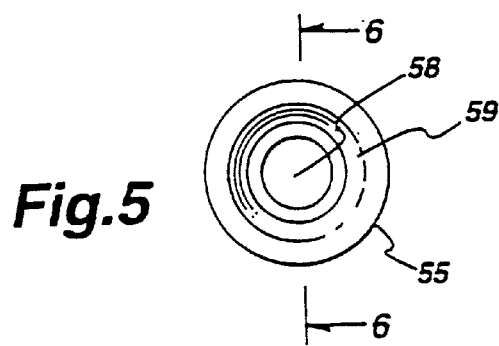
FIG. 5 is a top plan view of the washer forming another part of the fastener in accordance with the present invention.
Figure 6:
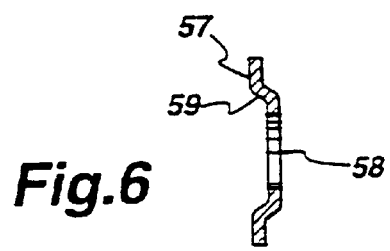
FIG. 6 is a cross sectional view taken along line 6—6 in FIG. 5.

The washer 55 as best illustrated in FIGS. 5 and 6 is a washer with circumferential, radially sloping surface or bevel 59 that surrounds a central aperture 58 at one end and further includes a flat peripheral ring like portion 57 at the other end. The diameter of the hole 58 is larger than that of the outer diameter of the post part 52 so as to allow washer 55 to be placed thereon. The bevel 59 creates a countersink surface against which the secondary head 80 may be flattened flush to prevent being uncomfortable to the user.

As best illustrated in FIG. 2, the helmet shell 10 is provided with a plurality of mounting apertures 12, each having a shape which substantially conforms to the intermediate obround locking section 46 of rivet 42. An accessorial padding 70 of stiff smooth layer that can be made from a variety of materials such as synthetic material, rubber or leather, is provided on the helmet shell 10 to prevent fastener 40 from damaging the surface of the helmet shell 10 and to cushion the face shield 30 against the helmet shell 10.

The accessorial padding 70 comprises two pairs of apertures, namely a front obround pair 72 and a rear circular pair 74. The front obround pair 72 conform with the shape of the mounting apertures 12 and the intermediate obround locking section 46 of fasteners 40. The rear circular pair 74 conform with the shape of the post part 52 of the rivet 42.

Figure 7:
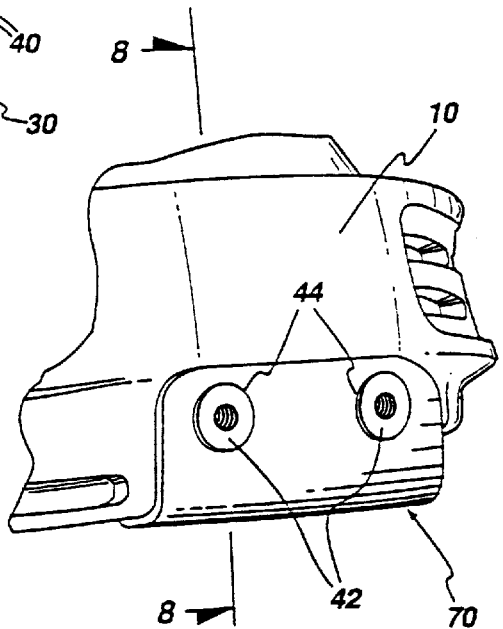
FIG. 7 is a partial perspective view of the protective helmet showing the front portion of the helmet shell with the fastener attached to the helmet shell.
Figure 8:
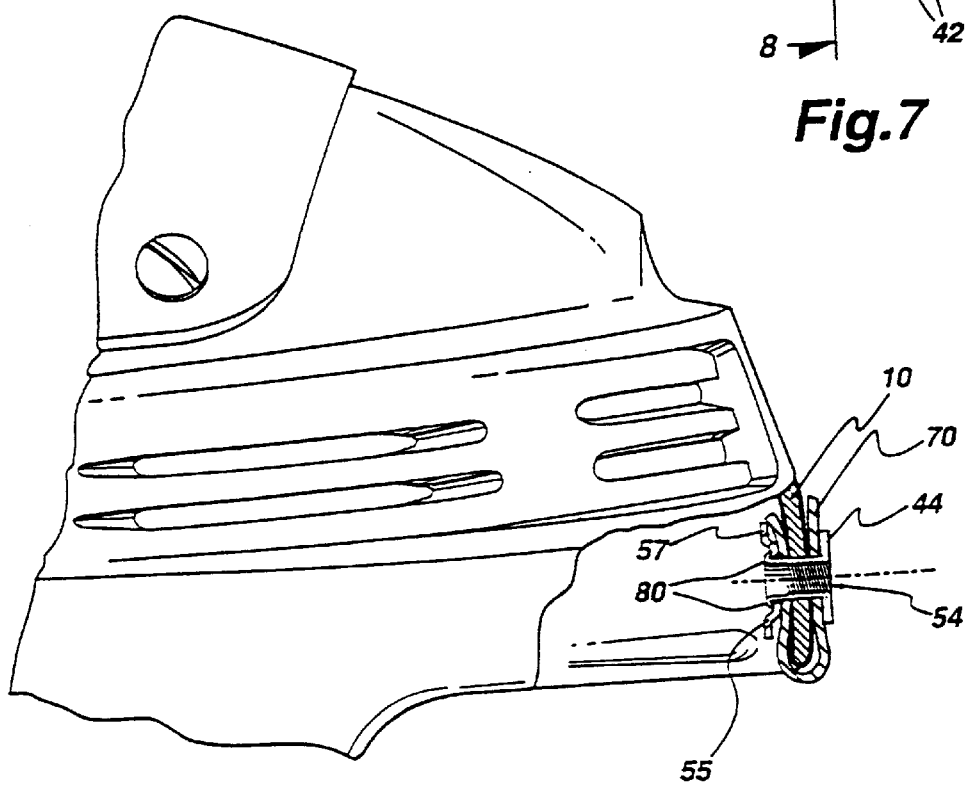
FIG. 8 is a cross sectional view taken along line 8—8 in FIG. 7.

In assembling the fastener 40 to the helmet shell 10, as depicted by FIG. 2, accessorial padding 70 is positioned over the edge of the helmet shell 10 so as to align front apertures 72 and rear apertures 74 with mounting apertures 12. The rivet 42 is then inserted into the aligned series of apertures. As best illustrated in FIGS. 7 and 8, the flanged head portion 44 of rivet 42, which is larger than all of these apertures, abuts against the outer surface of accessorial padding 70. The post part 52 of rivet 42 passes through the aperture and extends beyond the rear surface of the accessorial padding 70. It receives washer 55 which maintains the padding 70 against the inner surface of the helmet shell 10. To secure the fastener 40 onto the helmet shell 10, the end portion of the post part 52 which is malleable is deformed by means well known to those skilled in the art to form the second head 80 that overlaps the washer 55.

Figure 10:
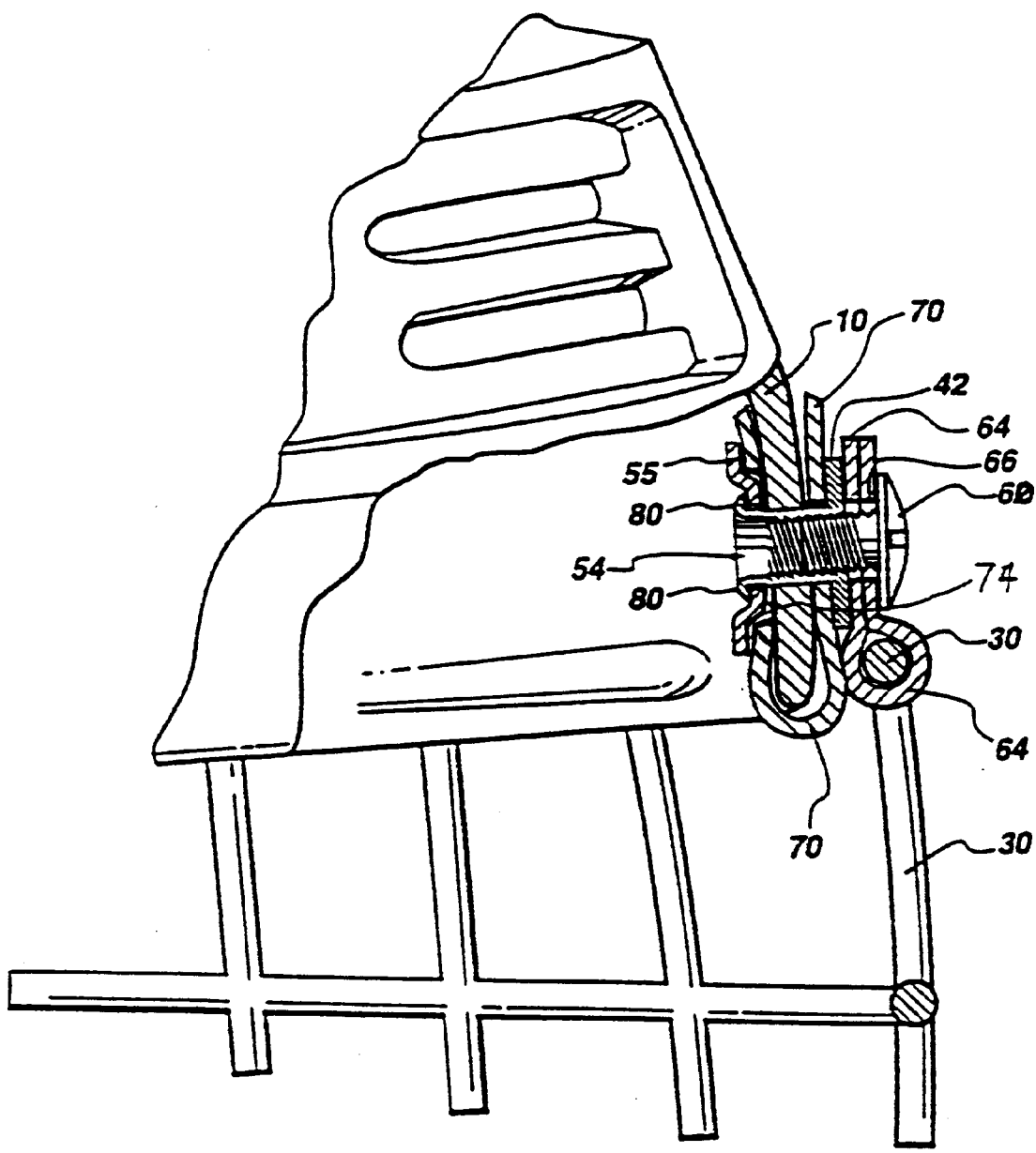
FIG. 10 is an enlarged cross-sectional view of the fastener secured to the helmet.

Advantageously, as shown in FIG. 10, the diameter of apertures 74 is slightly larger than the washer 55, allowing the latter to sit on the plastic shell. The peripheral ring portion 57 is thus less protuberant from the shell.

Figure 9:
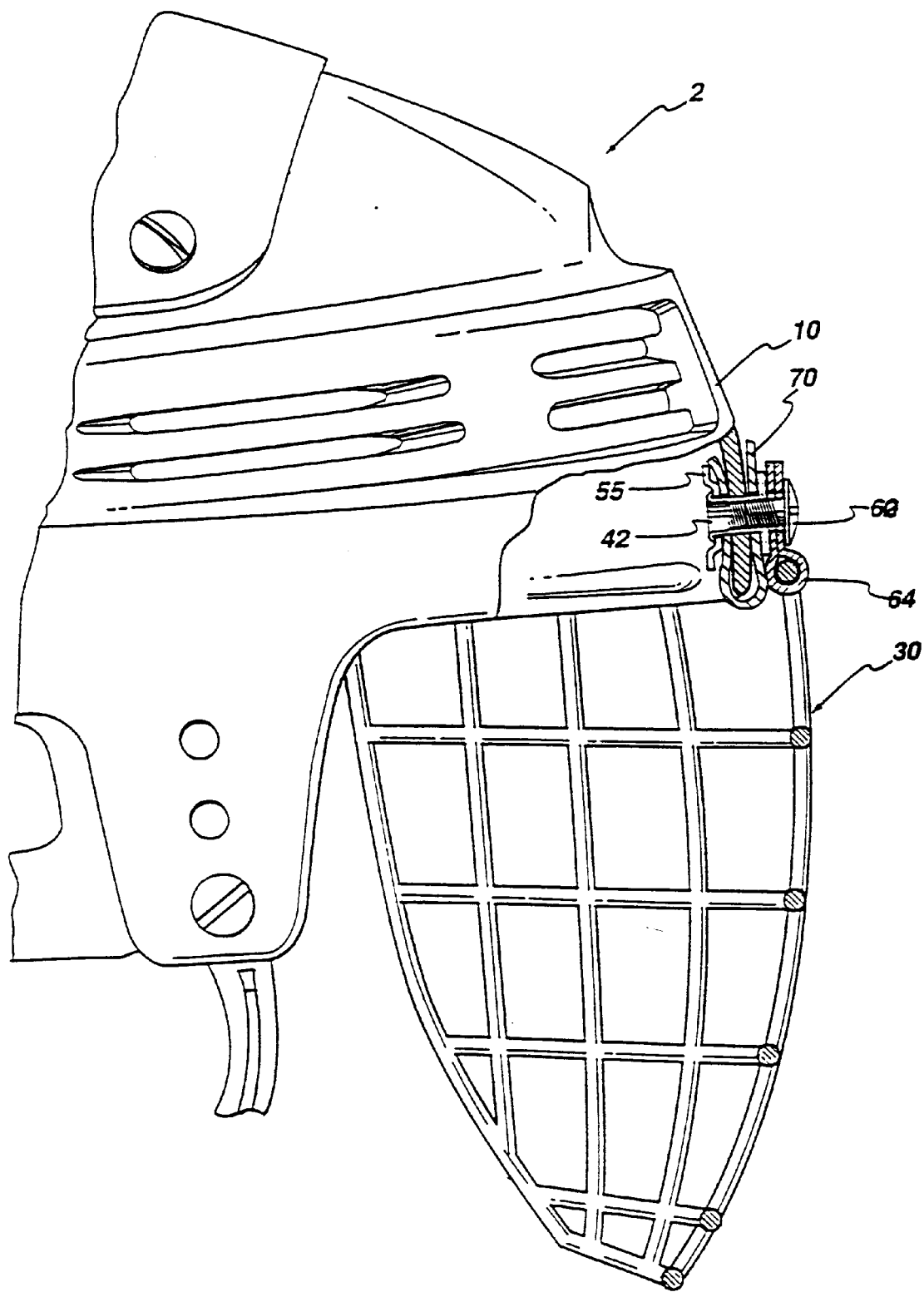
FIG. 9 is a partial side elevational view of the protective helmet with some portions being shown in cross-section.

Screw-type securement means 60 may comprise any conventional releasable fastener that is secured by rotary movement, such as threaded screws, or bayonet type clips. As seen in FIGS. 9 and 10, the screw-type securement means 60 comprises a standard threaded screw 60. Each bracket 64, which provides a channel within which the face guard 30 is held, is clamped by the screw 60 against a respective fastener 40 to retain the face guard 30 to the helmet shell 10. During introduction of the screw 60 into the fastener 40, the intermediate obround locking section 46 locks with mounting aperture 12 of the helmet shell 10, thus the screw 60 can be tightened without the need of hand tools to hold the fastener.

With respect to the above description, it is to be realized that the optimum dimensional relationships for the parts of the invention, to include variations in size, materials, shape, form, function and manner of operation, assembly and use, are deemed readily apparent to one skilled in the art, and all equivalent relationships to those illustrated in the drawings and described in the specification are intended to be encompassed by the present invention.

I claim:

1. A protective helmet capable of receiving an accessory, said protective helmet comprising:

a helmet shell shaped to protect the top, rear, front and sides of the wearer's head, said helmet shell comprising at least one mounting aperture; and at least one rivet-like member received into said at least one mounting aperture, said rivet-like member comprising a flanged head portion defining a first end of the rivet-like member which surfaces the outer helmet shell, an elongated body having at least on a portion of its length a locking section which is capable of establishing a locking engagement with said helmet shell when received in said mounting aperture to prevent said fastener from turning in said mounting aperture, and a post part defining a second opposite end of said rivet-like member, said post part capable of being flattened to form a secondary head which secures said rivet-like member to said outer helmet shell, said rivet-like member being capable of receiving a securement means for retaining an accessory to the helmet shell.

2. A protective helmet as defined in claim 1, wherein said rivet-like member further comprises a washer, said washer having an aperture that conforms to the shape of said post part of said rivet-like member, said shape of said aperture being substantially smaller than the shape of the secondary head of said post part, whereby said post part can receive said washer prior to when said secondary head is formed and whereby said washer is secured on said post part of said rivet-like member when said secondary head is formed.

3. A protective helmet as defined in claim 1, wherein said locking section of said rivet-like member is obround.

4. A protective helmet as defined in claim 3, wherein said post part extends longitudinally beyond said obround intermediate portion.

5. A protective helmet as defined in claim 4, wherein said post part has a substantially circular cross-sectional shape.

6. A protective helmet as defined in claim 1, wherein said rivet-like member further comprises an aperture extending longitudinally from said post port to said flanged head portion, said aperture being capable to accept a securement means to attach a protective accessory onto the protective helmet.

7. A protective helmet as defined in claim 7, wherein said aperture is threaded to accept a threaded screw.

8. A protective helmet according to claim wherein said securement means comprises a threaded screw capable of engaging said rivet-like member.

\* \* \* \* \*

UNITED STATES PATENT AND TRADEMARK OFFICE
CERTIFICATE OF CORRECTION

PATENT NO. : 5,978,973
DATED      : November 9, 1999
INVENTORS  : Daniel Chartrand It is certified that error appears in the above-identified patent and that said Letters Patent is hereby corrected as shown below:

Claim 6, column 6, line 12, change "post port" to read --post part--.

Claim 7, column 6, line 16, change "claim 7" to read --claim 6--.

Claim 8, column 6, line 17, after "claim" insert -- 7--

Signed and Sealed this

Twenty-seventh Day of June, 2000

Attest:

Q. TODD DICKINSON

*Attesting Officer*       *Director of Patents and Trademarks*